(Model.)
2 Sheets—Sheet 1.
R. T. PETTEBONE.
SCOOP.
No. 282,363. Patented July 31, 1883.
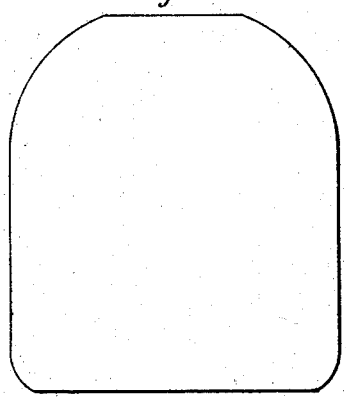
Fig. 1.
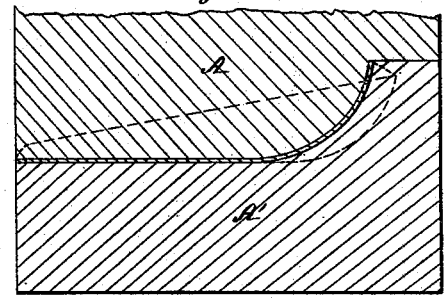
Fig. 2.
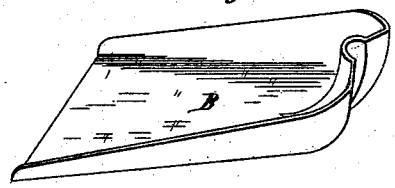
Fig. 3.
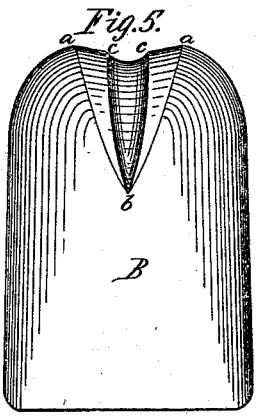
Fig. 5.
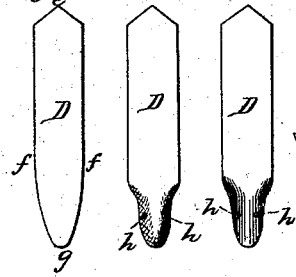
Fig. 6. Fig. 7. Fig. 8.
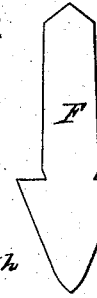
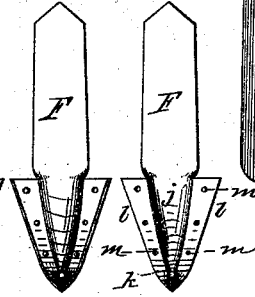
Fig. 9. Fig. 10. Fig. 11.
Witnesses:
W. C. Jislington
Fred P. Church
Inventor:
Robert Treat Pettebone,
by
Melville Church
his Attorney.
N. PETERS. Photo-Lithographer, Washington, D. C.

(Model.)

R. T. PETTEBONE.
SCOOP.

No. 282,363. Patented July 31, 1883.

Witnesses:
W. C. Jirdinston.
Fred F. Church.

Inventor:
Robert Treat Pettebone,
by
Melville Church,
his Attorney.

N. PETERS, Photo-Lithographer, Washington, D. C.

UNITED STATES PATENT OFFICE.

ROBERT T. PETTEBONE, OF WYOMING, PENNSYLVANIA.

SCOOP.

SPECIFICATION forming part of Letters Patent No. 282,363, dated July 31, 1883.

Application filed May 10, 1883. (Model.)

*To all whom it may concern:*

Be it known that I, ROBERT TREAT PETTEBONE, of Wyoming, in the county of Luzerne and State of Pennsylvania, have invented certain new and useful Improvements in Scoops; and I do hereby declare the following to be a full, clear, and exact description of the same, reference being had to the drawings forming a part of this specification, and to the figures and letters of reference marked thereon.

My invention has for its object to produce a strong serviceable scoop of symmetrical proportions from a minimum amount of material and by a comparatively few manipulations; and it consists in certain novel improvements, which will be first described, and then pointed out with particularity in the claims at the end of this specification.

In the following description of the manufacture of scoops according to my invention, attention is directed to the accompanying drawings, in which—

Figure 14:
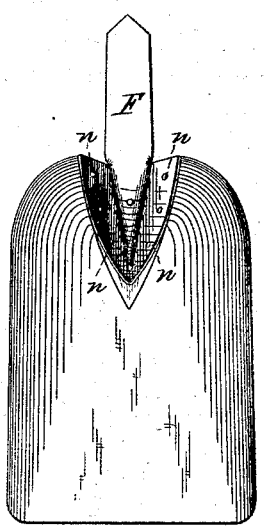
Figure 4:
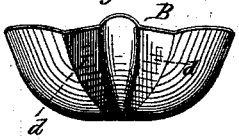
Figure 15:
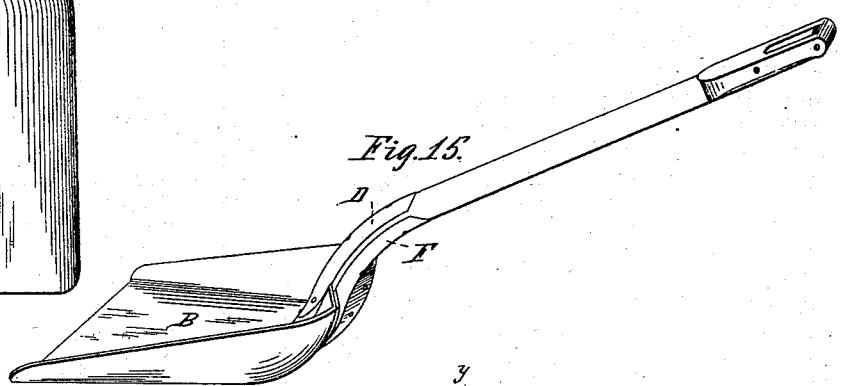
Figure 16:
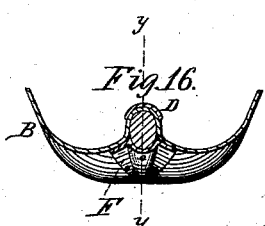

Figure 1 represents a plan view of the blank from which the blade of the scoop is formed; Fig. 2, a view showing the blank undergoing pressure in suitable dies to form the blade; Fig. 3, a perspective view of the completed blade as it appears after leaving the forming-dies; Fig. 4, a rear view, and Fig. 5 a bottom plan view, of the same; Fig. 6, a plan view of the front-strap blank; Fig. 7, a top plan view, and Fig. 8 a bottom plan view, of the front strap as it appears at the time of securing it to the blade; Fig. 9, a plan view of the back-strap blank; Fig. 10, a top plan, Fig. 11 a bottom plan, and Fig. 12 a perspective view, of the back strap as it appears at the time of securing it to the blade; Fig. 13, a top plan, and Fig. 14 a bottom plan, of the scoop and straps before the handle is applied; Fig. 15, a view of the completed scoop with the handle applied thereto; Fig. 16, a sectional view of the completed scoop, taken on the line $x\,x$, Fig. 17; and Fig. 17, a similar view taken on the line $y\,y$, Fig. 16.

Similar letters of reference in the several figures indicate the same parts.

I first take the blank shown in Fig. 1, which consists of a flat sheet of metal of the form indicated, and heat it to a red heat, and then by means of proper dies, A A', Fig. 2, suitably operated, press or swage said blank into the shape of the ultimate scoop-blade B, (shown in Fig. 3,) a depression being formed in the back of the blade, of wedge-shaped form longitudinally, extending from the points $a\,a$ at the upper back edge of the blade to a point, $b$, a considerable distance down the back of the blade, as shown in Fig. 5. The central portion of this depression, from the points $c\,c$ to the point $b$, is of semi-conical form, tapering from top to bottom, and is adapted to receive the tapered end of the wooden handle, as will be further on explained, while those portions of the depression lying on opposite sides of said handle-receiving portion, and comprehended within the shaded spaces $d\,d$, Fig. 14, are substantially flat laterally, though slightly curved longitudinally, and incline inward toward said handle-receiving portion, and constitute the bearings for the backwardly-turned flanges of the back strap. The front of the blade has of course a projection corresponding to the depression on the back, as will be apparent from inspection of Figs. 3 and 13.

In striking up the material of the blade to form the depression at the rear and the projection at the front by means of the dies, as above described, that portion of the material located at the top of the depression, which ordinarily in the manufacture of scoops is cut out, so as to leave a V-shaped notch, is swaged or taken up, so as to leave the stock continuous and unbroken.

Figure 17:
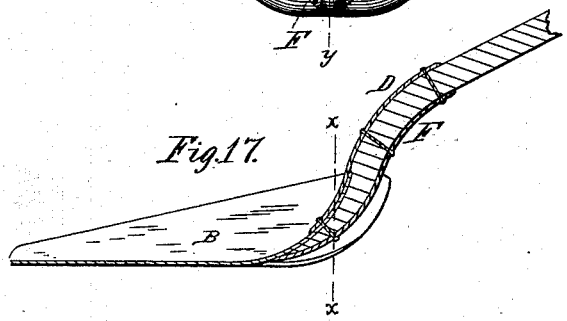

The front strap, D, is formed by striking up the flat blank represented in Fig. 6 into the form shown in Figs. 7 and 8—that is to say, substantially straight from point $e$ to points $f$ $f$, and thence tapering in semi-cylindrical form to the lower end, $g$, so as to fit over the upper portion of the projection at the front of the blade, as shown in Figs. 13 and 17, perforations $h\,h$ being provided for the passage of the securing-rivets $i\,i$, Fig. 17.

Figure 12:
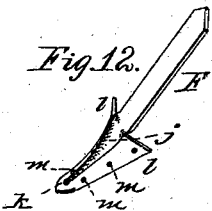
Figure 13:
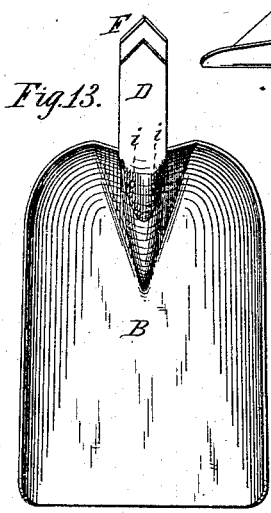

The back strap, F, is formed from the flat blank represented in Fig. 9 by striking the latter up into the shape shown in Figs. 10, 11, and 12—that is to say, with a substantially straight shank, a wedge-shaped lower end having a tapering handle-receiving recess, $j$, curved in cross-section, and extending down to point $k$, and the wide backwardly-turned tapering flanges $l\ l$, made straight in cross-section, and preferably provided with rivet-holes $m$, the whole being slightly curved longitudinally to correspond to the depression in the back of the blade, as shown in Fig. 12.

The blade and the front and back straps having been formed, the front strap is riveted to the front of the blade, its curved lower end fitting closely upon the upper portion of the front projection, as shown in Fig. 13. This done, the back strap is next applied to the depression in the back of the blade, its wide flat backwardly-turned flanges $l\ l$ resting upon the wide flat inclined bearing portions $d\ d$ of such depression, entirely below the general surface of the scoop-back, out of the way of wear, and its central tapering concave recess co-operating with the corresponding recess in the blade-back to form a tapering or conical socket for receiving the lower tapered end of the wooden handle. The back strap is secured in position by rivets $n$, passed through the flanges $l\ l$ and through the blade, as shown, the heads of the rivets also lying below the general wearing-surface of the scoop-back. After the handle is inserted, the shanks of the front and back straps are pressed down around it by dies or otherwise, as shown in Fig. 15.

It will be observed that, instead of using a large front strap as well as a large back strap riveted at the edges, as in the manufacture of ordinary scoops, I employ a small front strap and a large protected back strap having a wide bearing upon the blade and secured by rivets that are likewise protected.

The front and back straps are preferably made of iron, though they may, if desired, be made of steel. They may also be connected to the blade by welding or otherwise, instead of by rivets.

Having thus described my invention, I claim as new—

1. A scoop-blade having a depression formed in its back, of substantially wedge shape longitudinally, and a corresponding projection formed on its front, by striking up the metal of the blade in dies without removing any portion of the metal, as described, said depression being of semi-conical form at the middle and adapted to receive the tapered end or point of the handle, and having the flat portions located on opposite sides of the handle-receiving recess, substantially as set forth, for the purpose specified.

2. In the herein-described scoop, the combination of the blade having a depression formed in the back of its blade, of substantially wedge shape longitudinally, said depression being of semi-conical form at the middle and adapted to receive the tapered end or point of the handle, and having the flat portions located on opposite sides of the handle-receiving portion and inclined toward the latter, and the back strap fitting within said depression in the blade, and having the semi-conical recess for the handle, and the backwardly-turned flat flanges adapted to rest against the flat bearing-surfaces of the blade and to be secured thereto, substantially as described.

3. The herein-described scoop, consisting of the blade having the wedge-shaped depression in the back of its blade, and the corresponding projection on the front of the same, said depression being of conical form at the middle and formed into a conical recess to receive the handle, and flat and inclined on opposite sides of said conical recess, the short front strap secured to the front projection of the blade, as described, and the back strap fitting within the depression in the back of the blade, and having the conical recess for receiving the handle, and the backwardly-turned flat flanges fitting against the flat bearing-surfaces of the blade and secured thereto, the whole back strap being within the depression in the blade and below the line of wear, substantially as described.

ROBERT TREAT PETTEBONE.

Witnesses:
A. T. HEISER,
R. E. HUTCHINS.